Aug. 23, 1966     I. BROWNING     3,267,826
PHOTOGRAPHIC RECORDING AND REPRODUCTION METHOD AND APPARATUS
Filed March 4, 1963     3 Sheets-Sheet 1
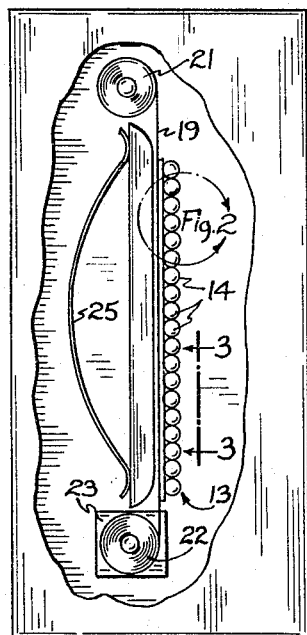
Fig. 1
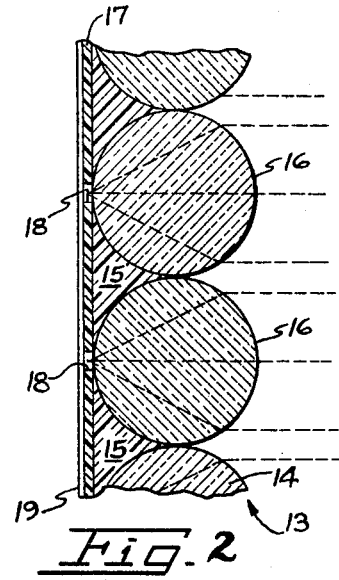
Fig. 2
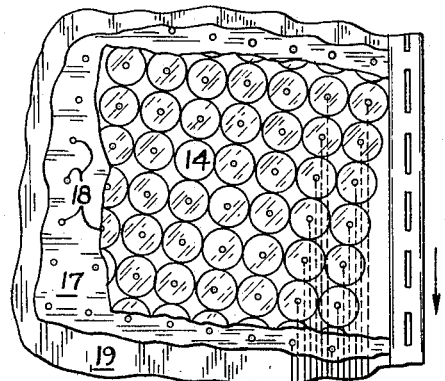
Fig. 3
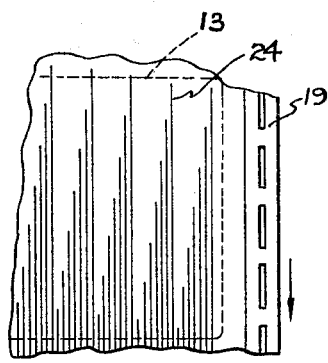
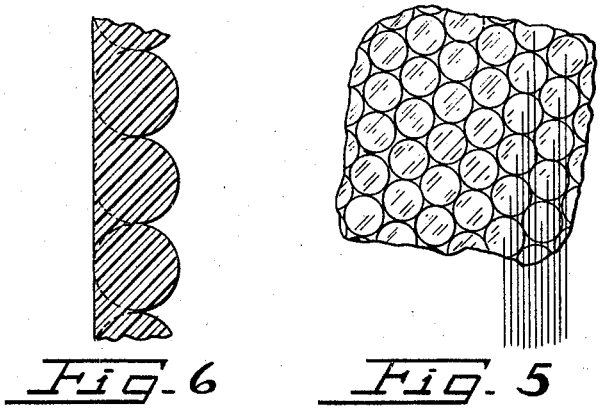
Fig. 4
Fig. 6     Fig. 5
INVENTOR.
IBEN BROWNING
BY
Townsend and Townsend
ATTORNEYS Aug. 23, 1966
I. BROWNING
3,267,826
PHOTOGRAPHIC RECORDING AND REPRODUCTION METHOD AND APPARATUS
Filed March 4, 1963
3 Sheets-Sheet 2
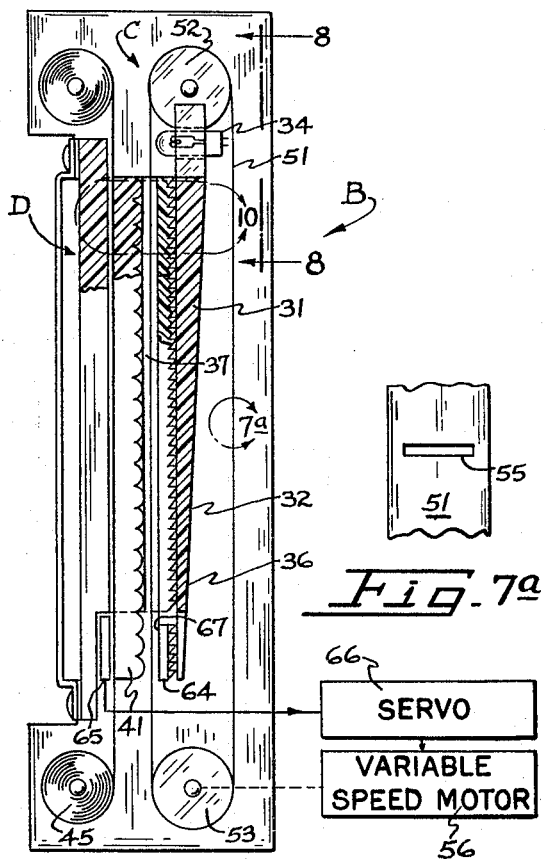
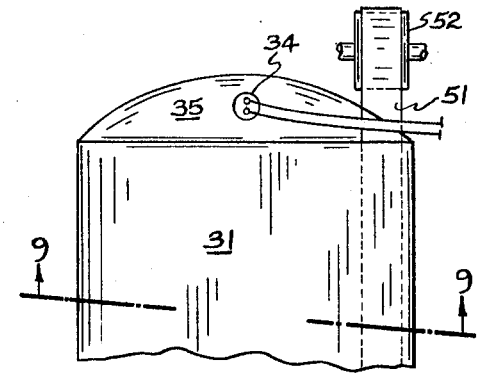
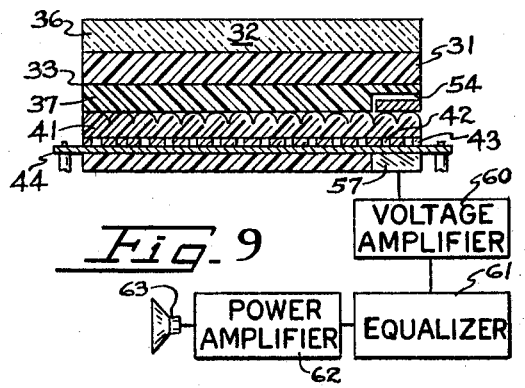
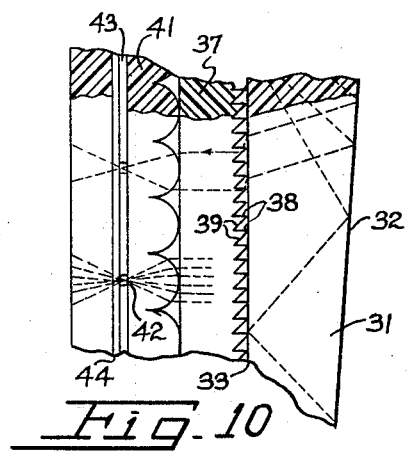
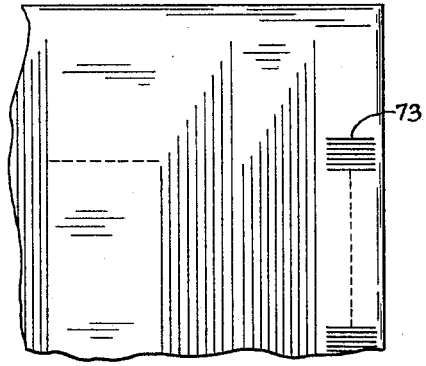
INVENTOR.
IBEN BROWNING
BY
Townsend and Townsend
ATTORNEYS Aug. 23, 1966     I. BROWNING     3,267,826
PHOTOGRAPHIC RECORDING AND REPRODUCTION METHOD AND APPARATUS
Filed March 4, 1963     3 Sheets-Sheet 3
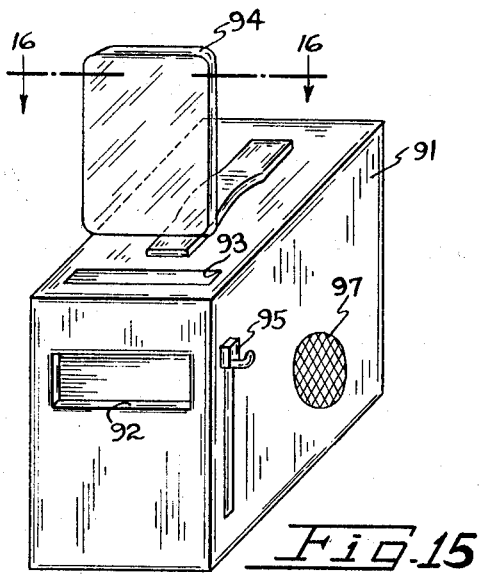
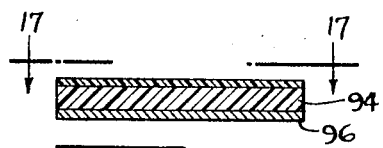
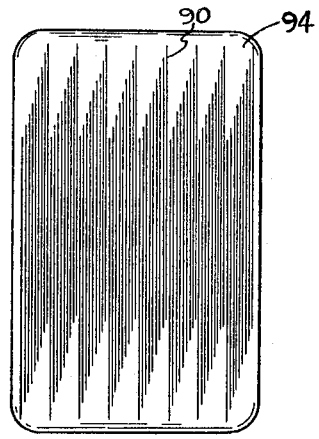
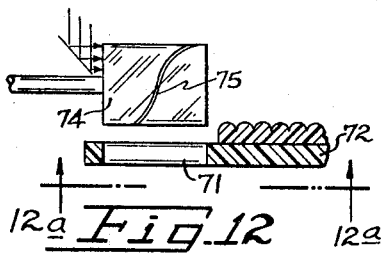
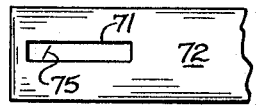
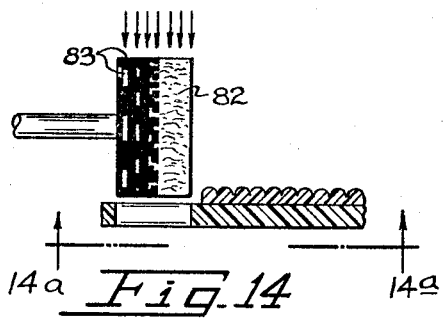
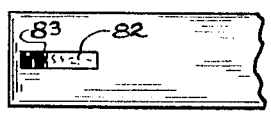
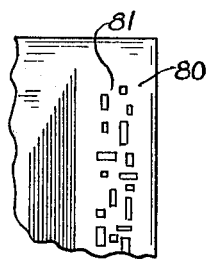
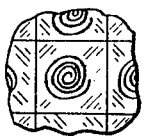
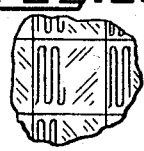
INVENTOR.
IBEN BROWNING
BY
Townsend and Townsend
ATTORNEYS

United States Patent Office 3,267,826
Patented August 23, 1966

3,267,826
PHOTOGRAPHIC RECORDING AND REPRODUCTION METHOD AND APPARATUS
Iben Browning, 1176 Sesame Drive, Sunnyvale, Calif.
Filed Mar. 4, 1963, Ser. No. 262,562
1 Claim. (Cl. 95—18)

The present invention is directed in general to method and apparatus for photographing and reproducing large quantities of information in an extremely compact manner.

Present methods and apparatus for photographing either an event such as a moving image or quanties of information, such as printed matter are bulky, expensive and produce a voluminous record which necessitates the use of bulky and expensive projection apparatus to reproduce the event or information.

The principal object of the present invention is to provide a method and apparatus for photographing a continuous event or a sequence of frames on a compact film plate and reproducing the event or sequence for viewing.

The photographic recording and reproduction apparatus according to the present invention utilizes a mosaic lens array having a front surface consisting of the front surfaces of the lenses, a film plate positioned behind the back surface of the array and means for moving the film plate at a slight angle with respect to the aligned lenses, each of the individual lenses of the array receiving light on a distinct portion of the front surface of the array and focusing a substantial portion of that light in a minute spot on the film plate moving relative thereto to cause the spots to trace streaks on the film plate, the streaks being traced parallel to each other and each of the spots having an area only a small fraction of the area of the portion of the front surface from which it originated.

One feature and advantage of this invention lies in the fact that a continuous exposure may be taken to record a continuing event without the necessity for utilizing a shuttering mechanism.

Another feature and advantage of the method and apparatus according to the present invention is that a large amount of information can be stored in an extremely small space and then reproduced in an economical manner.

Another object of the present invention is to mask all but a minute aperture between each lens of the lens array and the film plate to limit the size of the spots on the film plate.

Another feature and advantage of the invention is that the size of the streaks on the film plate is limited so that a large number of lenses can be utilized and a greatly extended time sequence can be provided with a minimum film space.

Another object of the present invention is the provision of such a method and apparatus in a camera and an object lens for directing the image of an event onto the lens array, whereby the event can be photographed on the film moving behind the image mask.

Another feature and advantage of such a method and apparatus is that a streak is produced on the film for each lens of the lens array, the intensity of each streak varying in accordance with the intensity of that portion of the image formed on the corresponding lens by the object lens.

Still another feature and advantage of the invention is that a sequence of frames formed on the lens array by the object lens may be recorded compactly on the film plate by the varying intensity of the spots for the separate frames.

Still another object of the invention is the provision of such a lens array and a developed film plate, which was exposed in such a camera, both positioned within a viewing apparatus which includes means for applying substantially parallel light to the lens array whereby light passing through the array and focused onto the streaks on the film plate moved relative thereto reproduces the photographed event on a screen positioned behind the film plate.

Another feature and advantage of this viewing apparatus is that the image of a continuous event or sequence of frames is reproduced onto the screen from a film plate only slightly wider than the screen and not a great deal longer than the screen.

Still another feature and advantage of this invention lies in the fact that with such a viewing apparatus a simple means for producing substantially parallel light can be utilized.

Still another feature and advantage of this invention lies in the fact that when an event is being reproduced a continuous visual image of the photographed event is produced on the screen without the necessity for a projection shutter mechanism.

Another object of the invention is a novel means for producing substantially parallel light including a wedge of transparent material having broad faces slightly inclined with respect to one another and a pick up lens with a saw-toothed surface positioned against a flat surface of the wedge for picking up and transmitting light passing out of the flat surface of the wedge.

Still another feature and advantage of this invention lies in the fact that substantially parallel light is produced from a miniature lamp utilizing inexpensive transparent material.

Still another feature and advantage of this parallel light producing structure lies in the fact that substantially all of the light introduced into the wedge is reflected until it emerges substantially parallel with other emerging light.

Still another object of the invention is the provision of an optically produced sound track accompanying a reproduced continuous visual image of an event by longitudinally optically scanning a sound-track information portion on the length of the developed film plate in the viewing apparatus during the movement of the film plate.

Still another feature and advantage of such a sound track is that the varying intensity streaks on the film plate used to produce such a sound track are similar and are aligned with the streaks used to produce the visual image thereby simplifying the "recording" of the sound track on the film plate.

Still another object of the invention is the provision of an optically produced sound track accompanying a reproduced continuous visual image of an event by horizontally scanning a portion of the film plate during movement of the film plate.

Still another feature and advantage of this sound track is that it is not necessary to provide as fast a mechanical movement as with a longitudinally scanned sound track.

Still a further object of the invention is the provision of an optically produced sound track accompanying the reproduced continuous visual image of an event by producing a light band chopped at different frequencies corresponding to audio frequencies and selectively passing a portion of the spectrum through the film plate to produce the desired sound track frequencies to accompany the visual image produced by the apparatus.

Still another object of the invention is the provision of a method for producing a closely packed array of lenses by first forming a rigid mold material over the top surface of a closely packed array of spheres positioned in a substantially flat plane, and then filling the mold with a material which, upon hardening, is transparent and causing the material to harden with one surface made up of a closely packed array of lens surfaces.

Other objects of the present invention will become apparent upon reaching the following specification and referring to the accompanying drawings in which similar characters of reference represent corresponding parts in each of the several views.

In the drawing:

FIG. 1 is a side elevational view, partially broken away, of a camera incorporating features of the present invention;

FIG. 2 is an enlarged sectional view of that portion of the structure shown in FIG. 1 delineated by line 2—2;

FIG. 3 is a front view, partially broken away, of that portion of the structure of FIG. 1, taken along line 3—3;

FIG. 4 is a plan view of a film plate produced by the camera in FIG. 1;

FIG. 5 is a plan view of an alternative lens mosaic construction;

FIG. 6 is a side sectional view of an alternative lens mosaic construction;

FIG. 7 is a side elevational view, partially in section, of an apparatus for viewing the film taken with the structure of FIG. 1;

FIG. 8 is a back view of that portion of the structure shown in FIG. 7 taken along line 8—8;

FIG. 9 is a cross-sectional view of that portion of the structure shown in FIG. 8 taken along line 9—9 and including other structure in block form;

FIG. 10 is an enlarged view of that portion of the structure shown in FIG. 7 delineated by line 10—10;

FIG. 11 is a plan view of a portion of a film plate illustrating one sound track embodiment of the present invention;

FIG. 12 is a side view, partially in section, of apparatus for producing a sound track with the film plate of FIG. 11;

FIG. 12a is a side view of the apparatus of FIG. 12 taken along line 12a—12a;

FIG. 13 is a plan view of a portion of a film plate illustrating an alternative sound track;

FIG. 14 is a top view, partially in section, of apparatus for producing a sound track with the film plate shown in FIG. 13;

FIG. 14a is a side view of the apparatus of FIG. 12 taken along line 13a—13a;

FIG. 15 is a perspective view of one photographic reproduction apparatus utilizing the present invention;

FIG. 16 is a cross section view of the film plate shown in FIG. 15 taken along line 16—16;

FIG. 17 is a rear view of the film plate shown in FIG. 16 taken along line 17—17; and FIGS. 18 and 19 are plan views of a portion of a film plate illustrating different manners of utilizing this invention.

While the invention is particularly adapted and will be first described for the production of a photographic record of a continuous event and the visual display of such a record, the invention is also useful for use in providing a record of a sequence of separate frames and the sequential display of such frames as will later be described in greater detail.

Referring now to the drawing, with particular reference to FIGS. 1–4, a camera A is provided which includes a casing 11 having an adjustable objective lens 12. The lens 12 is adjusted to produce an image of a continuous event upon the front surface of a lens array or mosaic 13. The lens mosaic 13 is a rectilinear array of a multitude of small spheres or beads 14 of transparent material such as, for example, glass. These spheres are supported in a substantially flat plane by means of an opaque binder 15 such as, for example epoxy interposed in the spaces between the spheres 14. The front semispherical lens surface 16 and the very back of each of the spheres 14 are left free of binder material so that light striking the front surface 16 of each sphere is focused by the sphere onto a tiny spot at the back of the sphere.

An image mask 17 is positioned behind the lens mosaic 13 and is provided with a minute aperture 18 at the focal spot for each of the spheres 14. Light incident on the front surface 16 of each sphere is focused through the aperture 18 therebehind and diverges from the back surface of the mask 17. A film strip or plate 19, moving from a supply reel 21 to a takeup reel 22 by means of a slowly moving drive motor 23 is driven past the back of the image mask 17 at a slight angle with respect to the edge of the rectilinear array of spheres 14 such that light passing through each of the apertures 18 and focused in a spot on the film plate 19 traces an individual streak 24 on the film plate 19. The angle with which the film plate is driven with respect to the edge of the rectilinear array is selected such that the streaks from all of the apertures are parallel and do not overlap when the film plate 19 is run the length of the lens mosaic 13. The streak produced by each sphere 14 varies in intensity in accordance with the intensity of the portion of the image that is produced on the front surface 16 of that sphere to record the variation in that particular portion of the image of the event being photographed. The film is developed and processed in the conventional manner.

A pressure plate 25 holds the film plate 19 securely in place in a precisely aligned film track. The film plate 19 is slightly wider than the lens mosaic and the length of the film plate is determined by the length of the lens mosaic, the resolving power of the film and the period of time for which it is desired to record.

The streaks 24 produced by these lenses are illustrated in FIGS. 3 and 4. As illustrated, between two spheres in any row running transversely of the film are positioned the streaks for a sphere in every row in the length of the lens mosaic 13. In order to maintain a distinct streak for each sphere in the rectilinear array illustrated in FIG. 3 the diameter of each aperture 18 in the mask 17 must be less than the diameter of the spheres divided by the number of spheres in a line aligned substantially parallel to the direction of film motion. The resolving power of the lens mosaic 13 and thus the definition of the recorded image on the film plate 19 is a function of the number and size of lens elements, provided that each sphere transmits light through its corresponding image mask aperture.

The size of the lens mosaic is illustrated in phantom in FIG. 4 as including that portion of the film in which all the streaks originate, the number of streaks illustrated being only a sufficient number to illustrate the invention. As is clear from the example given below the number of streaks typically is in the thousands and may be in the order of hundreds of thousands.

Since the effect of the lens mosaic 13 is to greatly reduce the recorded image element size, the film may be traversed at a rate very much slower than is possible with conventional motion picture cameras. For example, an hour of action which is to be viewed on a 17" screen might be recorded on a film plate whose dimensions are 17 inches wide and 24 inches high.

While the film plate has been illustrated as wound on reels 21 and 22, it can be of a rigid flat construction which can be continuously driven at a precise speed by any one of a number of drive means such as, for example, a worm gear.

Instead of the perfectly rectilinear array of spheres 14 as shown in FIG. 3, staggered rows of spheres such as illustrated in FIG. 5 can be utilized as well as a circular array of spheres provided that care is taken to prevent overlapping of the streaks on the film plate. However, according to the arrangement of FIG. 5, the length of the picture that can be taken is less since the streaks traced by two beads arranged transversely of the film are closer together and a smaller number of beads must be provided longitudinal of the mosaic. Overlapping of streaks on the film plate is prevented when the diameter of the aperture 18 and thus the width of the streak is at least as small as the quotient of the distance between centerlines of two adjacent rows of lenses making the same minimum angle with the film direction by the greatest number of lenses in either row. Also, since in reproducing the image a lens mosaic which is substantially identical to the camera lens mosaic must be used, a precise yet easily reproducible mosaic structure must be employed.

According to the presently described embodiment of this invention the necessity for a continuously operating shutter is avoided although a single action shutter, opening at the beginning of the photographed event and closing at the end of the event, is used to advantage.

Instead of a separate mask 18 the opaque binder 15 may be utilized for the mask, provided however that the size of the exposed portions of the spheres 14 on the back side of the mosaic is accurately controlled.

The image mask illustrated in the drawing may be produced by coating the surface of the lens mosaic with an emulsion and applying a photographic film plate against the lens surface to develop the film plate in the minute points of contact with the emulsion. Then a positive is produced which has transparent portions only at the places of contact between the film and mosaic. This will provide a mask with a transparent "aperture" appropriately positioned behind each lens.

Alternatively, the mask may be made by directing parallel light through the lens mosaic so that light from each lens is focused upon a very high contract emulsion, which, when developed, produces transparent portions in the film plate to serve as mask apertures.

Instead of the construction described above the lens mosaic may be molded entirely of a single material such as shown in FIG. 6. To produce such a mosaic a plurality of substantially perfect spheres such as appropriately sized ball bearings are arranged in the desired closely packed array. A mold material such as silicone rubber is then poured over the array and cured. Then, after the spheres have been removed the mold material is filled level with a lens material such as, for example, plastic which, upon hardening, is transparent. Once the lens material has hardened and has been removed from the mold material the lens mosaic is complete.

Referring now to FIGS. 7–10, there is shown a projection apparatus B in which light from a parallel light source generally indicated at C is directed through a lens mosaic, an image mask and a developed exposed photopositive film plate onto a screen D.

The source of parallel light C includes a wedge 31 of transparent material such as, for example, plastic having a narrow end and a wide end. The wedge 31 includes first and second substantially flat plane faces 32 and 33 arranged at a slight angle with respect to one another. Light is directed into the transparent wedge 31 from a bulb 34 which is positioned within a transparent head 35 positioned at the wide end of the wedge 31 and of heat resistant and heat absorbent material such as, for example, glass. Glass is used for the head 35 so as to physically remove the light source 34 from wedge 31 whereby the wedge may be of non-heat resistant material if desired. The outside exposed faces of the transparent head 35 and of the wedge 31, except face 33, may be coated with a layer 36 of reflecting material such as, for example, silver to produce light reflections within the head 35 and wedge 31.

Positioned against the wedge face 33 is a light pick-up lens 37 of transparent material, preferably the same material as the wedge 31. The lens surface adjacent the wedge 31 is provided with a grooved surface, saw-toothed in cross-section, with each of the grooves aligned parallel with the line of intersection of the planes of wedge faces 32 and 33, while the opposite surface of the lens is a plane surface substantially parallel to the wedge face 33. One side 38 of each of these teeth or grooves is sligned substantially perpendicular to the wedge face 33 while the other side 39 is positioned at an angle of substantially 45° with respect to the face 33 and inclined with respect to the face 33 in the same direction as the face 32. The inclined side 39 is covered with a layer of reflective material such as silver to produce internal reflections in the lens 37.

Light directed into the wide end of the wedge 31 is reflected back and forth from the faces 32 and 33, the angles of inclination increasing with each reflection due to the slight angle between the faces 32 and 33. When the angle of inclination just exceeds the critical angle of the wedge material, the light passes out of the face 33 traveling almost parallel therewith. This light then enters the saw-tooth surface of the pick-up lens 37 by passing substantially perpendicularly through the tooth sides 38 and, after internal reflection from the mirrored inclined side 39, emerges from the opposite plane surface of the pick-up lens 37 substantially perpendicular thereto. In practice the inclined sides 39 of the lens teeth are inclined at an angle just slightly greater than 45° to properly reflect light traveling almost parallel with the wedge face 33. The bulb 34, the wedge 31 and pick-up lens 37 jointly provide evenly distributed, substantially parallel light onto the front surface of a mosaic lens 41 substantially identical to the mosaic lens 13 used to expose the film plate 19 in the camera illustrated in FIGS. 1–4.

As illustrated clearly in FIG. 10, this parallel light is focused by the mosaic lens 41 through apertures 42 in an image mask 43 positioned against the flat side of the mosaic lens 41. The light passing through apertures 42 falls on the exposed streaks of a developed film plate 44 which was exposed by the camera A. The varying opaqueness of the streaks on this exposed film 44 permits light of varying intensities to pass through the film 44 onto the screen D. As the exposed film plate 44 is advanced by a drive wheel 45, a continuous image of the photographed event is reproced on the screen D.

Horizontal registration of the film plate 44 and the mask 43 must be precise so that each streak on the film plate is precisely under the appropriate lens corresponding to a lens which originally generated that streak, and vertical registration is also critical so that the event is reproduced from its beginning.

The screen D, preferably of the same material as the lens mosaic 41, has one surface which bears against the film plate 44 to hold the plate against the mask 43 and has an opposite frosted surface on which the reproduced image appears. This screen has an effective thickness substantially equal to the thickness of the mosaic lens 41 so that each spot of light is magnified to the same extent that the image on the mosaic lens surfaces was reduced in producing the film plate streaks. By permitting the light to diverge from the film plate for the same distance over which it was initially converged each fragment of the recorded image is properly magnified so that the fragments fuse into a perfectly reconstituted halftone picture. If the screen is of a material different from that of the lens mosaic, the screen thickness must be such that it is the same effective thickness as the lens mosaic.

Alternatively, the screen may be a lens mosaic identical to the mosaic 41 but reversed in direction to redirectionalize the light passing through the film 44 to produce an image on the lens surface of this additional lens mosaic substantially identical to the image produced on the film plate by a similar lens mosaic in the camera A.

Also, the film plate and the screen can be combined in a laminated element having a thin film lamination containing the streaks provided on one side of the element and a frosted screen provided on the other side of the element, the element having the same effective thickness as the lens mosaic.

The viewing apparatus in FIGS. 7, 8 and 9 is provided with a sound track to accompany the visual display of the recorded image. The sound track is recorded on the film plate 44 by light streaks running the length of the film plate similar to those producing the visual information. The sound track play back structure includes a continuous narrow belt 51 such as, for example, steel supported between an idler wheel 52 and a drive wheel 53 located respectively above and below the parallel light source C along the edge of the film plate 44. The surface of the pick-up lens 37 adjacent the lens surface of the lens mosaic 41 is provided with a notch 54 which permits this tape to run the length of the film plate 44. The belt 51 is provided with three equally spaced apart horizontal slots 55 so positioned that one slot is always in the sound track at any given time. The drive wheel 53 is driven by a variable speed motor 56. A strip photocell 57 runs the length of the film plate 44 on the opposite side thereof from the belt 51 in order to detect the light signals which produce the sound track. The belt 51 is run at such a speed with respect to the film plate 44 that light transmitted through the horizontal slots 55 from the pick-up lens 37 scans downwardly across the film plate 44. The light passing through the film plate 44 is of varying intensity due to the sound track on the film plate and is detected by the strip photocell 57. The output of the photocell is sequentially applied to a voltage amplifier 60, an equalizer 61, a power amplifier 62 and a loud speaker 63 to produce sound.

The speed of optically scanning this sound information on the film plate is the same as the initial speed with which the sound information was recorded on the film plate but does not exceed the speed of one full sweep per "frame equivalent" movement of the film plate. The speed is optically synchronized by synchronizing the maximization of a timing marker (not shown) on the edge of the film plate with the medium position of a slot 55 over a separate pick-up lens segment 64 below the pick-up lens 37 utilizing a photocell pick-up 65 for operating a servo mechanism 66 to correct the speed of the motor 56. The back surface 67 of the lens segment 64 is provided with an optical surface graded from transparent at one end to opaque at the other.

Optional sound track systems are illustrated in FIGS. 11–14.

Referring now to FIGS. 11 and 12, the sound track is produced by horizontally scanning separate horizontal lines on the film plate as the film plate is moved longitudinally through the viewing apparatus. More specifically, a horizontal slit 71 is provided in the image mask 72 along one edge of the film plate for illuminating a narrow horizontal portion of the film plate which is provided with sound track information recorded on horizontal lines 73. This horizontal slit is scanned by a horizontally directed "flying spot" which is created by shining light through a transparent, internally light reflecting cylindrical rod 74 which is provided with a spiral 75 scratched in the surface thereof to permit passage of light therethrough along the spiral. When the rod 74 is rotated and end illuminated, the horizontal slit 71 is scanned horizontally by a light spot created by the spiral 75 on the rod 74. The light passed through the film plate with this arrangement is picked up and converted into a sound track in the same manner as illustrated in FIG. 9.

Still a further alternative sound track system is illustrated in FIGS. 13 and 14 wherein a light band chopped at different frequencies corresponding to an audio frequency spectrum illuminates a narrow horizontal slit in the image mask and certain portions of this spectrum are passed through the film plate by the sound track information 81 recorded on the margin of the film plate 80. This information is picked up by a photocell detector and amplified in conventional fashion to produce the sound accompanying the visual image. The frequency spectrum can be produced in a manner illustrated in FIG. 14 by a rotating cylinder 82 on the surface of which are provided bands 83 of alternately transparent and blocked out areas to produce light chopped at different frequencies. Light directed on the back of the cylinder 82 is focused to a narrow line in alignment with the narrow slit in the image mask for passing the spectrum of chopped light through the margin of the film plate. Sound track information 81 recorded on the film plate 80 permits passage of the desired chopped light frequencies which are then converted to sound in the conventional manner. The chopping frequency is the product of the rate of rotation of the cylinder and the number of light and dark segments around its circumference. This number of light and dark segments is varied lengthwise of the cylinder to constitute a spectrum of audio frequencies when it is rotated. All of the frequencies transmitted through the narrow slit and sequentially differentially transmitted through the sound track on the film plate are collected additionally by a photocell, amplified and rendered as audio sound.

By way of example, a typical viewing apparatus is illustrated in FIGS. 15–17 along with the film plate that is inserted therein. The viewer consists of a casing 91 provided therein with a parallel light source, a lens mosaic and an image mask of the type described above. The casing is provided with a viewing window 92 and a slot 93 to receive a film plate 94 whereby the picture can be viewed through the viewing window 92. The film plate is inserted in the viewing apparatus and a cocking lever 95 depressed to position the film plate ready for producing a pictorial image of a continuous event previously photographed and recorded in the form of vertical streaks 90 on the back of the film plate 94. The front of the film plate is provided with a frosted surface 96 which serves as the screen for the viewing apparatus. A sound track is reproduced with a speaker 97 which is provided in the casing 91.

In a typical embodiment of the present invention a toy viewing apparatus providing reasonably good resolution is provided with a lens mosaic 3 inches high and 5 inches wide that covers the entire film plate including sound track, a viewing screen 3 inches high and 4 inches wide and an 8" x 5" film plate. The lens mosaic is made up of 25 lenses to the linear inch or a total of 9375 lenses, each of the lenses having a diameter of .04", the apertures in the image mask behind the lens mosaic having a diameter of about .00053". By moving the film plate at a speed equivalent to 16 frames per second, a film plate approximately 8" long will produce a continuous visual image over a 10 minute running time.

As an alternative embodiment, the present invention is utilized for a microfilm card reader by providing a shutter in the camera so that with a time exposure each "frame," which consists of one recorded spot for each of the lenses in the lens mosaic, provides a single frame on the film plate. Thus, each frame can constitute a picture of a printed page, and thus a book several hundred pages in length can be recorded for reproduction on a small film card. In the viewing apparatus for such a film card reader, the film plate is advanced manually or in measured increments for reproducing successive photographed pages.

Instead of recording the light spot images from all of the lenses of a lens mosaic in streaks lengthwise of a film plate, the film plate might be moved with respect to the lens mosaic to trace a streak which is traced parallel to every other streak but with each streak tracing a spiral or a raster such as shown in FIGS. 18 and 19 respectively. Such an arrangement would be particularly well adapted for use in a micro card reader and the number of possible frames would be approximately the area behind each of the lenses divided by the area of one of the apertures in the image mask.

In all embodiments of the invention the optical elements of the camera and viewing apparatus are made of the same material so as to avoid differential expansion and problems caused by different indecises of refraction.

Although the foregoing invention has been described in some detail by way of illustration and example for purposes of clarity of understanding, it is understood that certain changes and modifications may be practiced within the spirit of the invention as limited only by the scope of the appended claim.

I claim:

A photographic recording and reproducing apparatus including a casing, a lens mosaic rigidly supported in said casing and comprising a multitude of lenses constructed and arranged in a stationary closely packed array, said mosaic having a front and a back surface with said front surface substantially consumed by the front surfaces of said lenses for receiving light to be transmitted to said back surface, a film plate positioned within said casing adjacent the back surface of said mosaic, and means for moving said film plate past said mosaic in a direction that lies at an angle with respect to any row of said lenses, the front surface of each of said lenses receiving light on a distinct portion of said front surface of said mosaic and focusing a substantial portion of that light in a minute spot on said film plate, said mosaic constructed such that the diameter of said spots is at least as small as the quotient of the distance between the centerlines of two adjacent rows of lenses making the same minimum angle with the film direction by the greatest number of lenses in either row whereby when said film plate moves past said mosaic the spot from each of said lenses traces a streak on said film plate and the streaks from all of said lenses are parallel.

References Cited by the Examiner
UNITED STATES PATENTS

| | | | |
|---|---|---|---|
| 1,864,969 | 6/1932 | Steele | 88—24 |
| 1,875,244 | 8/1932 | Keen | 95—18 X |
| 1,883,290 | 10/1932 | Ives | 88—24 |
| 1,935,471 | 11/1933 | Kanolt | 95—18 |
| 1,942,840 | 1/1934 | Sheppard | 18—57 |
| 2,086,182 | 7/1937 | Dvornik | 94—18 X |
| 2,596,740 | 5/1952 | Tuttle | 352—81 |
| 2,943,533 | 7/1960 | Goodbar | 95—18 X |
| 2,950,644 | 8/1960 | Land | 95—18 |
| 3,099,195 | 7/1963 | Goodbar | 95—37 |

JOHN M. HORAN, *Primary Examiner.*